Aug. 11, 1931.　　　D. E. GRAY　　　1,818,475
LOADING AND UNLOADING DEVICE
Filed Nov. 15, 1927　　　2 Sheets-Sheet 1
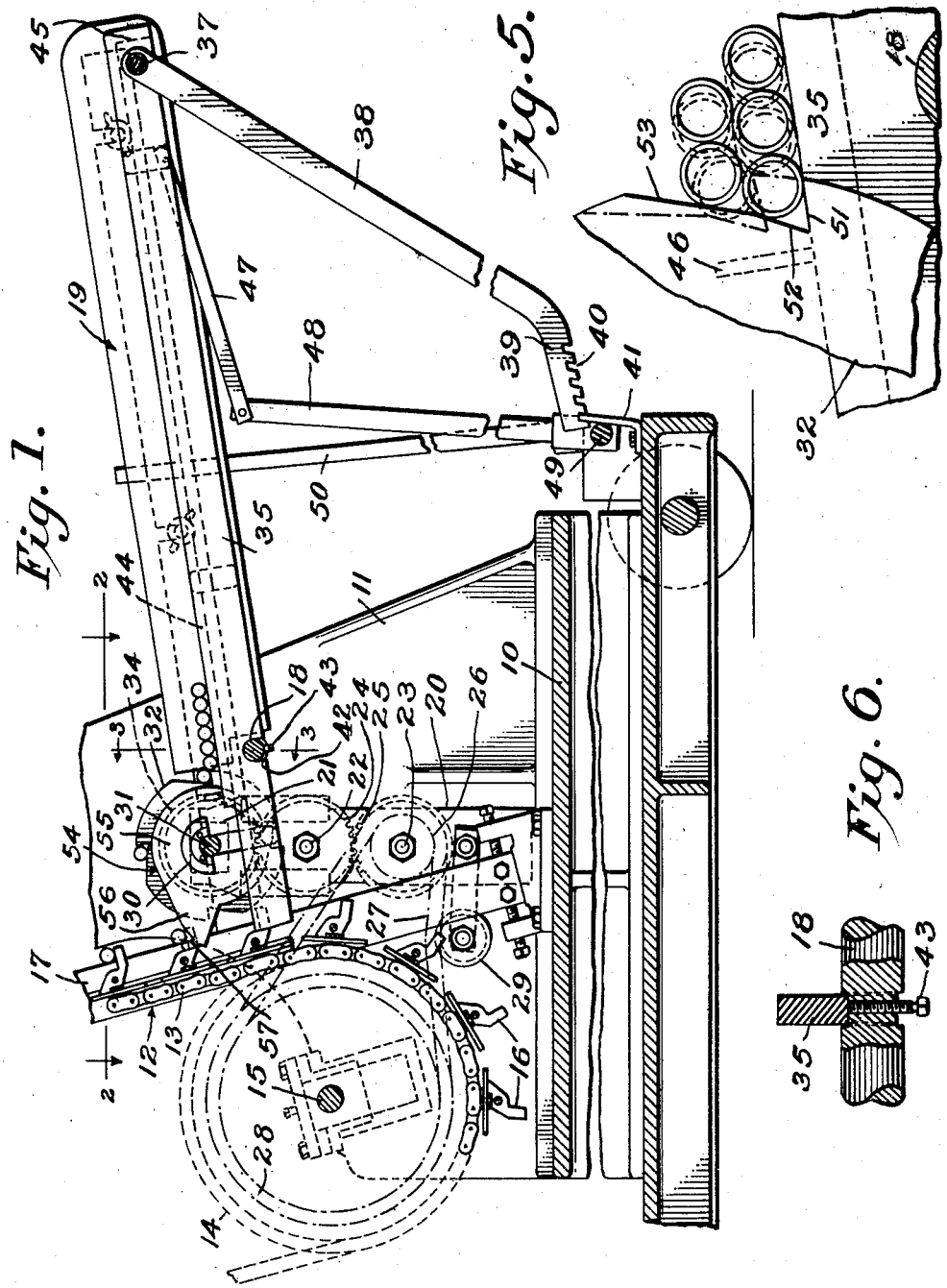
INVENTOR
DAVID E. GRAY
BY
ATTORNEYS.

Aug. 11, 1931.  D. E. GRAY  1,818,475
LOADING AND UNLOADING DEVICE
Filed Nov. 15, 1927  2 Sheets-Sheet 2
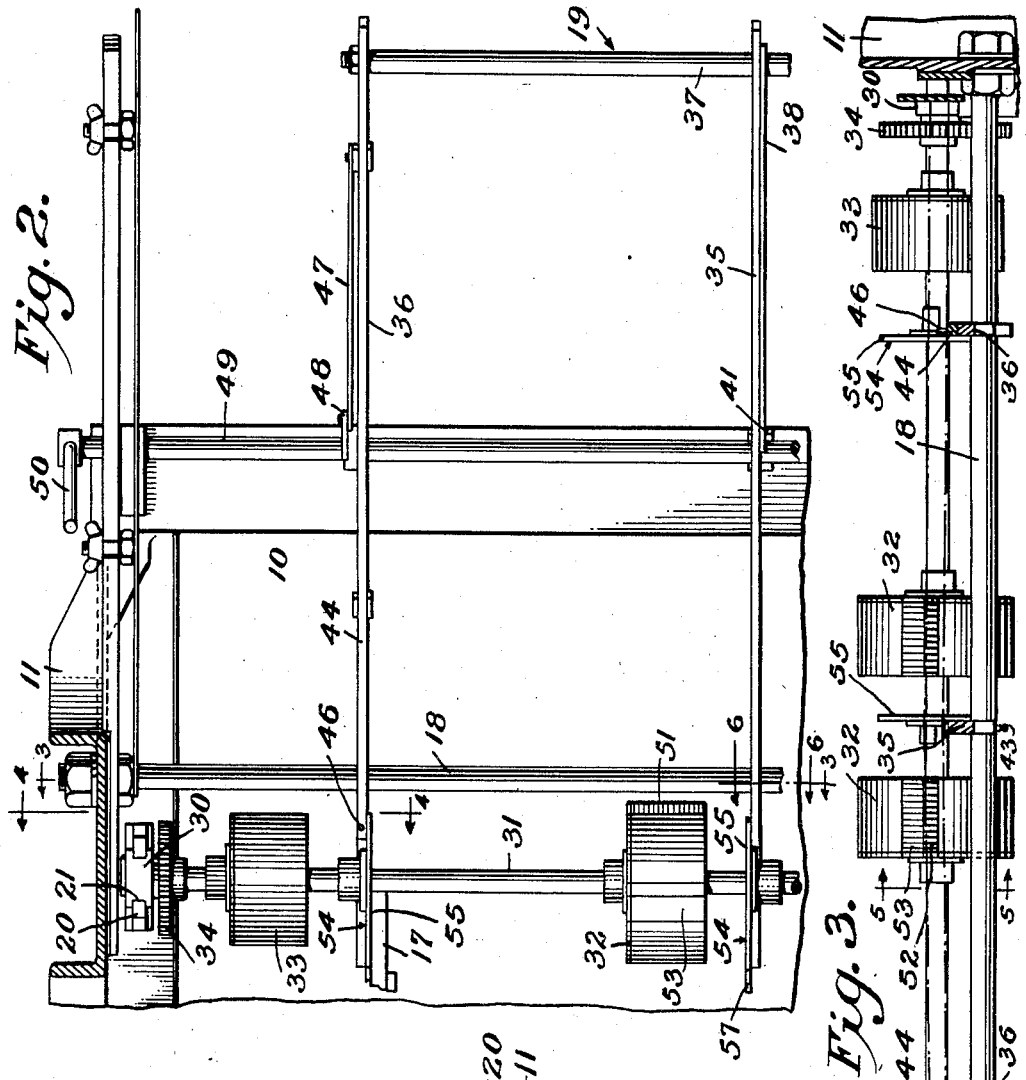
INVENTOR
DAVID E. GRAY
BY
ATTORNEYS Patented Aug. 11, 1931

1,818,475

UNITED STATES PATENT OFFICE

DAVID E. GRAY, OF CORNING, NEW YORK, ASSIGNOR TO CORNING GLASS WORKS, OF NEW YORK, N. Y., A CORPORATION OF NEW YORK

LOADING AND UNLOADING DEVICE

Application filed November 15, 1927. Serial No. 233,474.

This invention relates to loading and unloading devices, and more particularly to devices for feeding articles to other mechanisms.

It is essential for many operations that articles be selected from a receptacle individually and delivered to a machine, and in the handling of fragile articles, such as glass tubing and cane, extreme care must be exercised to guard against breakage. Consequently, such articles cannot be dumped promiscuously into the receptacle and selected at random by the usual delivery apparatus.

It is an object of the present invention to rapidly select articles from a receptacle and to deliver them one at a time, without injury, and without prearranging them into a single layer.

The invention embodies among its features one or more feed rolls specially designed and constructed to preclude the possibility of delivering more than one article at a time, irrespective of the number of articles with which it may contact during its delivery movement.

Another feature is the manner of supporting the articles in the magazine to present them to the feed rolls in planes substantially parallel to its axis.

Among other important features are the interchangeability of the feed rolls to readily adapt the feeder to handle articles of different sizes, the adjustability of the receptacle to govern the movement of the articles toward the feed rolls, and the absence of elements which might introduce breakage of fragile articles.

With the above and other objects in view, which will become more apparent as the description proceeds, the invention consists in the novel construction, combination and arrangement of parts, which will be fully set forth and claimed in the following specification, and illustrated in the accompanying drawings, in which:

Fig. 1 is a vertical sectional view through a portion of a gaging machine equipped with this improved feeder;

Fig. 2 is a horizontal sectional view taken in the plane of line 2—2 of Fig. 1;

Fig. 3 is a vertical transverse sectional view taken on the line 3—3 of Figs. 1 and 2;

Fig. 4 is an enlarged detail sectional view taken on the line 4—4 of Fig. 2;

Fig. 5 is an enlarged detail sectional view taken in the plane of line 5—5 of Fig. 3; and Fig. 6 is a vertical transverse section taken on the line 6—6 of Fig. 2.

In one embodiment of my invention a bed 10, of a gaging or other machine to which the articles are to be delivered, supports a pair of standards 11 between which a carriage mechanism 12 is suspended. This comprises endless carriers, such as chains 13, which are trained over sprockets 14 fixed to a shaft 15 that is mounted for rotary movement near the lower ends of the standards. Traveling article carriers 16 are secured to the chains 13 and their forward ends project beyond the forward faces of guide bars 17 upon which travel the articles to be gaged. These guide bars are supported in any suitable manner in spaced parallel relation between the standards 11.

Extending transversely between the standards 11, in spaced parallel relation to the shaft 15, is a supporting bar 18 upon which rest the inner ends of rails forming the bottom of a magazine 19.

Secured in spaced relation to the inner faces of the standards near their lower ends are plates 20, the upper ends of which are bifurcated as at 21 for a purpose to be more fully described hereinafter. Extending inwardly from one of the plates 20 are studs 22 and 23 upon which are respectively mounted intermeshing pinions 24 and 25. The hub of pinion 25 is extended inwardly and carries at its inner end a sprocket 26 over which the drive chain 27 is trained. This drive chain runs over a sprocket 28 which is rotatably secured to the shaft 15. In this manner power is transmitted to the feed roll driving pinion when the shaft 15 is rotated. A suitable take up roller 29 is yieldingly held in contact with the lower run of chain 27 to keep it taut.

Removably mounted in the bifurcations 21, at the upper ends of the plates 20, are bearings 30 in which the feed roll carrying shaft 31 is journalled. Feed rolls 32 are secured in spaced relation intermediate the ends of shaft 31 and these are provided with longitudinally extending peripheral grooves to receive the articles to be fed. Supporting elements of slightly less diameter than the feed rolls 32 are secured near opposite ends of shaft 31 to support the ends of the articles during their travel on the feed rolls. These supporting elements may take various forms, such as rolls 33, although disks could be substituted if desired. A drive pinion 34 is secured near one end of shaft 31 for engagement with pinion 24, so that motion of the latter will drive the shaft and feed rolls.

The magazine 19, above referred to, comprises a main supporting rail 35 and a plurality of spaced parallel guide rails 36. These are secured at their outer ends to a transversely extending supporting rod 37, to which an arm 38 is pivoted. This arm is provided at its free end with an angular extension 39, the lower edge of which is notched, as at 40, for the reception of an upwardly extending tongue 41 secured to the bed 10. By engaging the tongue in different notches, the outer ends of the rails 35 and 36 may be moved in unison to tilt the magazine to varying angles. The rails 35 and 36 are notched as at 42 (Fig. 1) near their inner ends for engagement with the supporting bar 18, hence their outer ends may be elevated or lowered as desired.

The inner end of the centermost rail 35 is supported on an adjusting screw 43 which extends through a threaded opening formed in the bar 18 (Fig. 6). It is desirable that the articles to be fed lie parallel to the axis of the feed rolls and this is automatically accomplished by elevating the rail 35 above the plane of the rails 36. By thus supporting the articles at a point substantially midway of their length, they will tend to bow in a substantially vertical plane, so that articles which become bent or bowed during their manufacture will be presented with their longitudinal axis substantially parallel with the axis of the shaft 31. Furthermore, articles which are normally straight will tend to bow by reason of their being suspended at one point, and such bowing will keep them from lying askew and becoming entangled with one another.

Mounted for longitudinal sliding movement on the rails 36 are rods 44, the outer ends of which are provided with stops 45 to limit their movement toward the machine. The inner ends of the rods extend slightly beyond the plane of the peripheries of the supporting rolls 33 (Fig. 4) and are provided with upwardly extending fingers 46, which engage and withdraw the articles advancing toward the feeder should such withdrawal become necessary. In order that these rods 44 may be withdrawn in unison, one end of a link 47 is pivoted to each rod, and its opposite end is pivoted to a lever 48, secured to a shaft 49 which is mounted upon the bed 10 for rocking movement with relation thereto. Movement of the shaft 49 is controlled by hand levers 50 which are secured to opposite ends of the shaft, so that withdrawal of the articles may be easily accomplished, should it be found desirable to discontinue the feeding of articles into the machine.

The peripheries of feed rolls 32 are provided with equidistantly spaced grooves to receive the articles to be delivered, one wall of each groove forming a seat 51 to support the article during its upward travel. The angular relation of each seat 51 is such that when it reaches article receiving position it presents an inclined surface upon which an article may easily and gently move into place from the magazine. The back wall 52 of each groove limits the entrance of an article thereinto, and permits its center of gravity to pass just beyond the outer edge of seat 51, without permitting the next article to enter the groove. It is therefore important that the feed rolls be interchangeable to accommodate different sized articles. Connecting the edge of each wall 52, opposite that joining its seat 51, with the periphery of the roll, is a plane face 53 whose angular relation to the articles in the magazine, when the roll is in article receiving position, prevents the other articles from riding upon the article resting on the seat. The foremost article in the magazine contacts with the face 53 as the corresponding seat 51 approaches article receiving position, and gradually advances into position to be engaged by the seat, thus eliminating danger of the seat moving beyond article receiving position unoccupied. Furthermore, the face 53 facilitates the discharge of the article from its seat when the latter reaches delivery position.

Resting on the shaft 31 adjacent each feed roll and supporting element is a stationary guide member 54, which in the present instance takes the form of a disk 55 of somewhat less diameter than the supporting elements. A peripheral projection extends tangentially from each disk 55 to form a guide finger 56, the upper ends of which incline inwardly and downwardly toward the machine, so that articles deposited thereon by the feed rolls will be delivered by gravity into the path of the carriers 16. Stops 57 are formed at the innermost ends of the guide fingers 56. Other forms of guide members may be substituted, or the guide members may be wholly dispensed with, without departing from the spirit and scope of this invention.

The operation of the device is as follows: The proper feed roll assembly is selected to fit the range of sizes of articles to be handled, and is mounted on the machine by sliding the bearings 30 into place in the bifurcations 21 of plates 20 and meshing pinion 34 with pinion 24. The articles are then placed in the magazine with their longitudinal axes substantially at right angles to the rails 35 and 36 so they will move by gravity toward the feed rolls, their speed being governed by adjusting the height of the outer end of the magazine. It has been found that smaller articles require greater elevation of the outer end of the magazine. Moving downwardly along the rails, the articles encounter the peripheries of the feed rolls and are selected thereby one at a time as previously described, to be deposited on the guide fingers 56. In order that bowed articles may be picked up by the feed rolls, the screw 43 of the rail 35 is adjusted to slightly elevate it. This will cause the articles to bow in a vertical plane so that their longitudinal axes are presented to the feed rolls substantially parallel to their axis. In this position one of the articles may freely enter one of the grooves. Furthermore by bowing the articles in vertical planes in the magazine, they will automatically assume parallel relation and any tendency to become entangled and lie askew will be overcome by gravity. In case of necessity the articles may be withdrawn from contact with feed rolls, without removing them from the magazine, by moving one of the hand levers 50.

As will be seen from the foregoing, the articles are automatically selected and presented for delivery, one at a time, without introducing oscillating escapements or other mechanism which might injure fragile articles.

While in the foregoing there has been shown and described a preferred embodiment of this invention, it is to be understood that minor changes in the details of construction, combination and arrangement of parts may be resorted to without departing from the spirit and scope of the invention as claimed.

I claim:

1. A feeder which includes an article holding magazine having means for elevating one portion of each article above the plane of the rest of the article whereby the articles will arrange themselves in parallel planes.

2. A feeder which includes a magazine having article supporting means, one portion of which is elevated above the general plane thereof, whereby articles will arrange themselves in parallel relation.

3. A feeder which includes a magazine having an article support, the centermost portion of which is elevated longitudinally to bow articles lying transversely thereof.

4. A feeder which includes a magazine having a plurality of rails for supporting articles therein and means for elevating one of said rails above the plane of the other rails, whereby articles thereon will arrange themselves in parallel relation.

5. A feeder which includes a magazine having a plurality of spaced parallel rails to support articles therein and means to elevate the centermost rail whereby the articles will bow longitudinally and arrange themselves in parallel relation transversely of the rails.

6. A feeder which includes a magazine having means for supporting a portion of an article above the major part of the article, and a feed roll having means for engaging the elevated portion of the article and removing it from the magazine.

7. A feeder which includes a magazine having means for supporting intermediate portions of articles in a plane above other portions of the articles, and feed rolls having means for engaging the elevated portions of the articles to remove them from the magazine one at a time.

8. A feeder which includes a feed roll, a magazine, and stationary means forming part of the magazine for insuring the reception of tubes by the feed roll, even though the tubes are bent.

9. A feeder which includes a grooved feed roll for engaging articles intermediate their ends, supporting elements moving in unison with the feed roll for supporting portions of the articles not engaged by the feed rolls, a magazine for presenting the article to the feed roll and means forming a part of the magazine for elevating the intermediate portions of the articles above their ends.

DAVID E. GRAY.